US012620235B2

(12) United States Patent
Lewin et al.

(10) Patent No.: US 12,620,235 B2
(45) Date of Patent: May 5, 2026

(54) VEHICLE CONTROL SYSTEM USING A SCANNING SYSTEM

(71) Applicant: JAGUAR LAND ROVER LIMITED, Whitley (GB)

(72) Inventors: Andrew Lewin, Coventry (GB); Nigel Clarke, Coventry (GB); Mariyan Zarev, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 401 days.

(21) Appl. No.: 18/002,027

(22) PCT Filed: Jun. 16, 2021

(86) PCT No.: PCT/EP2021/066271
§ 371 (c)(1),
(2) Date: Dec. 15, 2022

(87) PCT Pub. No.: WO2021/255110
PCT Pub. Date: Dec. 23, 2021

(65) Prior Publication Data
US 2023/0245414 A1 Aug. 3, 2023

(30) Foreign Application Priority Data

Jun. 17, 2020 (GB) ...................................... 2009226

(51) Int. Cl.
*G06V 20/56* (2022.01)
*G01S 13/931* (2020.01)
(Continued)

(52) U.S. Cl.
CPC ............ *G06V 20/56* (2022.01); *G01S 13/931* (2013.01); *G01S 15/931* (2013.01); *G01S 17/931* (2020.01);
(Continued)

(58) Field of Classification Search
CPC ...... G06V 20/56; G06V 10/25; G01S 13/931; G01S 15/931; G01S 17/931; G01S 17/86; G06T 2207/30252
See application file for complete search history.

(56) References Cited

U.S. PATENT DOCUMENTS 9,239,959 B1 1/2016 Evans et al.
10,302,746 B2 5/2019 O'Keeffe
(Continued)

FOREIGN PATENT DOCUMENTS

CN 109997057 A 7/2019
CN 110537108 A 12/2019
(Continued)

OTHER PUBLICATIONS

Great Britain Intellectual Property Office, Combined Search and Examination Report under Sections 17 and 18(3) Issued in Application No. GB2009226.8, Dec. 8, 2020, 6 pages.
(Continued)

*Primary Examiner* — Casey L Kretzer
(74) *Attorney, Agent, or Firm* — McCoy Russell LLP

(57) ABSTRACT

A control system for a vehicle can include one or more controllers, and is configured to: determine a region of interest within a field-of-view of a scanning system of the vehicle; and operate the scanning system to scan portions of the field-of-view outside the region of interest at or below a nominal scanning resolution, and to scan the region of interest at an increased scanning resolution relative to the nominal scanning resolution.

13 Claims, 4 Drawing Sheets

(51) Int. Cl.

| | |
|---|---|
| *G01S 15/931* | (2020.01) |
| *G01S 17/86* | (2020.01) |
| *G01S 17/931* | (2020.01) |
| *G06V 10/25* | (2022.01) |

(52) U.S. Cl.

CPC .............. *G06V 10/25* (2022.01); *G01S 17/86* (2020.01); *G06T 2207/30252* (2013.01)

(56) References Cited

U.S. PATENT DOCUMENTS

| | | | |
|---|---|---|---|
| 10,481,268 | B2 | 11/2019 | Vlaiko et al. |
| 2009/0097038 | A1 | 4/2009 | Higgins-Luthman et al. |
| 2016/0291134 | A1 | 10/2016 | Droz et al. |
| 2016/0318365 | A1* | 11/2016 | Sivaraman ............. G01S 17/88 |
| 2017/0176990 | A1* | 6/2017 | Keller ..................... G01S 17/42 |
| 2017/0289474 | A1 | 10/2017 | Aoyama |
| 2018/0107221 | A1 | 4/2018 | Droz et al. |
| 2018/0120440 | A1 | 5/2018 | O'Keeffe |
| 2018/0128920 | A1* | 5/2018 | Keilaf ..................... G01S 17/10 |
| 2018/0306905 | A1 | 10/2018 | Kapusta et al. |
| 2019/0383911 | A1* | 12/2019 | Zhang .................. G02B 26/101 |
| 2020/0150228 | A1* | 5/2020 | Kapusta .................. G01S 17/10 |
| 2021/0097303 | A1* | 4/2021 | Diehl ...................... G06V 20/56 |
| 2021/0152732 | A1* | 5/2021 | Eki ...................... H04N 23/661 |

FOREIGN PATENT DOCUMENTS

| | | | |
|---|---|---|---|
| GB | 2545652 | A | 6/2017 |
| GB | 2562037 | A | 11/2018 |
| WO | 2014154839 | A1 | 10/2014 |
| WO | 2018194721 | A1 | 10/2018 |

OTHER PUBLICATIONS

SA European Patent Office, International Search Report and Written Opinion Issued in Application No. PCT/EP2021/066271, Sep. 16, 2021, WIPO, 12 pages.

State Intellectual Property Office of the People's Republic of China, Office Action and Search Report Issued in Application No. 202180042527.9, Jan. 31, 2026, 14 pages. (Submitted with Partial Translation).

* cited by examiner

VEHICLE CONTROL SYSTEM USING A SCANNING SYSTEM

CROSS REFERENCE TO RELATED APPLICATIONS

The present application is a U.S. National Phase of International Application No. PCT/EP2021/066271 entitled "VEHICLE CONTROL SYSTEM USING A SCANNING SYSTEM," and filed on Jun. 16, 2021. International Application No. PCT/EP2021/066271 claims priority to Great Britain Patent Application No. 2009226.8 filed on Jun. 17, 2020. The entire contents of each of the above-listed applications are hereby incorporated by reference for all purposes.

TECHNICAL FIELD

The present disclosure relates to a vehicle control system using a scanning system. Aspects of the invention relate to a control system for a vehicle, to a method for controlling a vehicle, and to a vehicle.

BACKGROUND

Modern cars and other vehicles are increasingly equipped with various sensing systems for exploring the vehicle surroundings, and control systems for using the information obtained by such sensing systems for improved automatic or semi-automatic control of vehicle functions, such as steering, acceleration or braking. For example, GB patent no. 2 545 652 discloses the use of a camera or lidar system to scan the road ahead of the vehicle, with the obtained input being used to vary suspension damping in dependence on surface features or terrain types detected on the road ahead.

Ideally, such sensing and control systems would be able to scan the full immediate and more distant surroundings of the vehicle instantly at high resolution, process all of the obtained information quickly and adapt the vehicle control in dependence on the obtained information in an optimised manner.

In reality, all sensing systems have inherent limitations: a limited field-of-view, which takes time to scan; power requirements; reduced ability to detect certain types of objects; and varying accuracy in terms of determining the position and dimensions of detected objects. For example, vehicle-mounted radar systems typically offer an angle accuracy of approximately 1°, which at a range of 200 m equates to an entire lane of traffic. Accordingly, such a radar system may be of limited use for characterising distant vehicles or other objects, which may be important when the vehicle travels at high speed.

Other problems associated with sensing systems include their cost, the difficulty associated with integrating the system into the overall vehicle design, and poor reliability under certain weather and other environmental conditions.

In practice, many vehicles use a combination of different sensing systems to compensate for the respective weaknesses of each individual system, each system being optimised for one or more particular tasks. However, each additional sensing system adds cost and control complexity.

It is against this background that the present invention has been devised.

SUMMARY OF THE INVENTION

Aspects and embodiments of the invention provide a control system for a vehicle, a vehicle, and a method for controlling a vehicle as claimed in the appended claims.

According to an aspect of the present invention there is provided a control system for a vehicle, the control system comprising one or more controllers. The control system is configured to determine a region of interest within a field-of-view of a scanning system of the vehicle. The control system is further configured to operate the scanning system to scan portions of the field-of-view outside the region of interest at or below a nominal scanning resolution, and to scan the region of interest at an increased scanning resolution relative to the nominal scanning resolution.

Operating the scanning system may comprise generating a control signal that is issued to the scanning system by the control system, for example. Alternatively, the control system may be integrated into the scanning system.

Optionally, the one or more controllers collectively comprise: at least one electronic processor having an electrical input for receiving signals comprising data obtained by the scanning system; and at least one memory device electrically coupled to the at least one electronic processor and having instructions stored therein. The at least one electronic processor is configured to access the at least one memory device and execute the instructions thereon so as to operate the scanning system to scan portions of the field-of-view outside the region of interest at or below a nominal scanning resolution, and to scan the region of interest at an increased scanning resolution relative to the nominal scanning resolution.

With the control system according to the invention, it becomes possible to control the vehicle based on more accurate sensor information and to improve the vehicle performance and/or the comfort of the driver and other passengers, without reducing the actual field-of-view. By focusing the capacity of the scanning system on the region of interest, and paying less attention to the remainder of the field-of-view, more time and power can be used for scanning important portions of the field-of-view. This allows for quicker reactions from the vehicle control system and an increased accuracy in detecting objects or road features that may warrant a control action from the vehicle control system. By continuing to monitor also the rest of the field-of-view, the system can remain responsive to objects and events occurring outside the region of interest. When needed, the control system may change the region of interest or, temporarily, use a single scanning resolution for the full field-of-view.

The scanning system may, for example, comprise a lidar system, a radar system, a camera system or an acoustic sensor such as an ultrasound scanning device.

The control system may be configured to receive a signal comprising data obtained by the scanning system related to the region of interest; analyse the data related to the region of interest to identify a feature within the region of interest; and generate a control signal to adjust operation of the vehicle in accordance with the feature identified within the region of interest.

The control signal may, for example, be configured to adjust the operation of any one or more of: a suspension system of the vehicle; a powertrain system of the vehicle; a braking system of the vehicle; a steering system of the vehicle; a driver assistance system of the vehicle; a collision mitigation system of the vehicle; and a human-machine interface of the vehicle.

Operating the scanning system to scan at an increased scanning resolution may comprise any one or more of: reducing a scanning speed of the scanning system; increasing a scanning power of the scanning system; reducing angular intervals at which the scanning system captures data points; increasing a focal length of the scanning system; and increasing a scan frequency at which the scanning system scans the region of interest. These and other measures for increasing the scanning resolution lead to the region of interest being scanned in higher detail than the other regions of the field-of-view, and/or to spend a greater portion of the total scanning time, i.e. greater than before increasing the scanning resolution, on the more interesting regions. As a result, relevant objects, road features and events in the region of interest are detected more reliably and/or earlier and the control system is enabled to provide more adequate responses within reduced response times.

In an embodiment, the control system is configured to receive an environment signal comprising data related to an environment in a driving direction of the vehicle; analyse the data related to the environment in the driving direction of the vehicle to identify a potential hazard; and determine the region of interest so that the region of interest contains the potential hazard. The environment signal may, for example, comprise data originating from any one or more of: the scanning system; a lidar system; a camera system; a thermal imaging system; a navigation system; an acoustic sensor system; and a radar system. In this way, different systems of the vehicle may cooperate in determining the region of interest in which scanning effort should be concentrated, thereby increasing the versatility of the system to respond to changing environments.

For example, when the scanning system or camera system indicate that a road quality at the left side of the road ahead of the vehicle is of a lower quality, the region of interest may be determined to cover the left side of the road. By increasing the scanning resolution in that area, the control system is then better equipped to, for example, accurately detect the position and dimensions of potholes in that part of the road and pre-emptively adapt a suspension system accordingly, taking into account the response time of the suspension system. In another example, the navigation system may indicate that the vehicle will soon turn right, in which case the region of interest is determined to be more to the right side of the vehicle.

In an embodiment of the invention, the control system is configured to determine the region of interest to correspond to a location directly ahead of a road wheel of the vehicle with respect to a driving direction. This is particularly useful when the control system acts on the suspension system of one or more wheels. With a region of interest that is located on the road surface and just in front of the wheel for which the suspension is controlled, the control system can quickly respond to the detection of stones, potholes and other obstacles in front of the respective wheel. When taking into account the current driving direction, for example based on steering wheel sensors, wheel angle sensors or accelerometers, the region of interest can be adapted to be better focused on that part of the road surface the wheel is actually going to drive over. The more accurate the prediction of where the wheel is going to ride, the narrower the region of interest can be defined. This brings the additional advantage that the scanning resolution can be increased maximally for the most important region in the field-of-view, with only a minimal reduction of the scanning resolution outside that region.

The region of interest may correspond to an area extending up to five meters from the road wheel of the vehicle.

Alternatively, or in addition, the control system may be configured to determine a region of interest by obtaining a predefined region of interest, for example from a look-up table. The control system may use the predefined region of interest directly, or may adapt the region of interest dynamically, for example based on real-time data.

Similarly, the control system may be configured to determine the region of interest to correspond to a location at least one hundred meters ahead of the vehicle with respect to a driving direction. This may be useful to detect vehicles ahead when the vehicle is travelling at high speed.

The control system may be configured to receive a signal indicative of a vehicle operating parameter, and to determine the region of interest in accordance with the signal indicative of the vehicle operating parameter. For example, the vehicle operating parameter may be a steering angle, a vehicle speed, or a vehicle braking state.

The scanning system may comprise a lidar system, for example. The scanning system may alternatively comprise any of a radar system, an acoustic sensor system, a camera system, or a thermal imaging system.

Preferably, the control system is further configured to characterise the feature identified within the region of interest as any of: an irregularity in a surface over which the vehicle is travelling; an obstacle; and another road user; and generate the control signal to adjust operation of the vehicle in accordance with the characterisation of the feature identified within the region of interest.

Another aspect of the invention provides a system comprising a vehicle scanning system and the control system of the above aspect. The control system includes at least a first controller, wherein the at least a first controller is arranged to output a signal for operating the scanning system to scan portions of its field-of-view outside the region of interest at or below a nominal scanning resolution, and to scan the region of interest at an increased scanning resolution relative to the nominal scanning resolution.

The invention also extends to a vehicle comprising the control system or the system of the above aspects.

A further aspect of the invention provides a method for operating a vehicle scanning system. The method comprises: determining a region of interest within a field-of-view of the scanning system; and operating the scanning system to scan portions of the field-of-view outside the region of interest at or below a nominal scanning resolution, and to scan the region of interest at an increased scanning resolution relative to the nominal scanning resolution.

Other aspects of the invention provide computer software that, when executed, is arranged to perform a method of the above aspect, and a non-transitory, computer-readable storage medium storing instructions thereon that, when executed by one or more electronic processors, causes the one or more electronic processors to carry out the method of the above aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In general terms, embodiments of the invention identify regions of interest within a field-of-view of a vehicle scanning system, such as a lidar system, to concentrate scanning effort where it is most needed. As all scanning systems have inherent limitations, this approach ensures that the available resources are allocated in an appropriate manner to retrieve more data relating to important parts of the vehicle environment, instead of scanning the entire field-of-view evenly. This makes better use of scanning and processing resources than in known arrangements.

For example, this approach may allow the scanning system to identify objects that require high-power scanning that could otherwise be missed, noting that the practical limitations of scanning systems typically preclude operation at high power across the entire field of view. For example, objects such as tyres on a road are not reflective and so can only be detected by a lidar or radar when operating at high power.

Accordingly, embodiments of the invention optimise usage of sensors onboard a vehicle, potentially relieving demands on other sensors and reducing the likelihood of having to include additional sensors to provide new or improved functionality.

Figure 1:
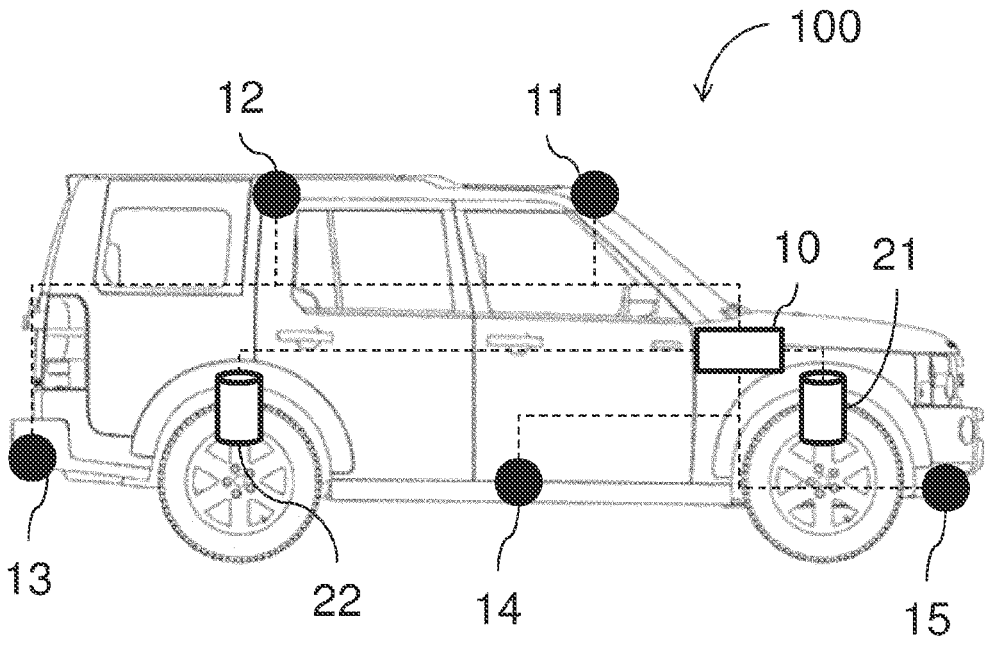
FIG. 1 shows a schematic drawing of a vehicle in which embodiments of the invention may be implemented.

A vehicle 100 in accordance with an embodiment of the present invention is described herein with reference to the accompanying FIG. 1. It is noted that, although FIG. 1 shows a car, the invention is similarly applicable to other wheeled vehicles, such as vans, trucks, motorbikes, or even non-wheeled vehicles like boats.

The vehicle 100 comprises a control system with a controller 10 for processing sensor information and controlling at least part of the operation of the vehicle 100. The controller is coupled, for example via a communications bus, to one or more sensors or scanning systems 11-15 and one or more vehicle control systems 21, 22.

By way of example, the sensors 11-15 included in the vehicle 100 may include any of:

A scanning system (e.g. lidar, radar, camera or ultrasound) for scanning the direct environment around the vehicle 100.

A digital camera system for capturing images of the direct environment around the vehicle 100. The camera system may comprise more than one camera, and could for example be a stereo camera system, capable of capturing images in 3D. The camera system may, for example, use visible and/or infrared light to capture images. When capturing images periodically and at a sufficiently high rate (e.g. 24 frames per second), the camera can be considered a video camera. It is noted that camera systems that can be controlled to vary their field-of-view are also to be seen as scanning systems. Changing the field-of-view may be achieved by physical means, i.e. by moving (parts of) the, or each, camera, or by altering the focal length of the camera. Alternatively, the field-of-view may be adjusted digitally by only processing part of the obtained image data or by processing part of the obtained image data at an increased resolution.

Angle sensors, measuring a current orientation of, for example, a steering wheel, a steerable wheel or a steerable axle. Such angle sensors provide information about the direction of movement of the vehicle 100.

Pedal sensors, indicating a current position of a brake pedal or an accelerator pedal.

Rain sensors, light sensors and other types of sensors that can monitor environmental conditions that may influence the functioning of vehicle systems such as the scanning system, the digital camera system, or the vehicle control systems 21, 22 operated by the controller 10.

All such sensors 11-15 are placed at suitable positions for optimal efficacy. For example, scanning systems for detecting and measuring distances to objects (stationary or moving) in the vehicle's surroundings, are conveniently placed in a front or rear fender (sensors 13, 15) or between front and rear wheels, close to the bottom of the vehicle 100 (sensor 14). Visible and/or infrared camera systems (e.g. sensors 11, 12) may be placed higher up to maximise the field-of-view. It is, however, noted that the suggested sensor type and sensor placement are not intended to limit the scope of the invention in any way. Other sensors in other positions can be used for, or in combination with, the method and control system of the current invention.

Similarly, also as an example only, the vehicle control systems 21, 22 included in the vehicle 100 may include any one or more of a steering system, a braking system or an adjustable front or rear suspension system 21, 22. The front and rear suspension systems 21, 22 may be controlled individually, proportionally or according to a fixed relation between the two. Similarly, separate suspension systems 21, 22 may be available and individually controllable for the left and right wheels of the vehicle 100.

As is already clear from the examples above, sensing systems may be controllable for adjusting important sensing parameters, while control systems may include sensors for monitoring their status.

Figure 2:
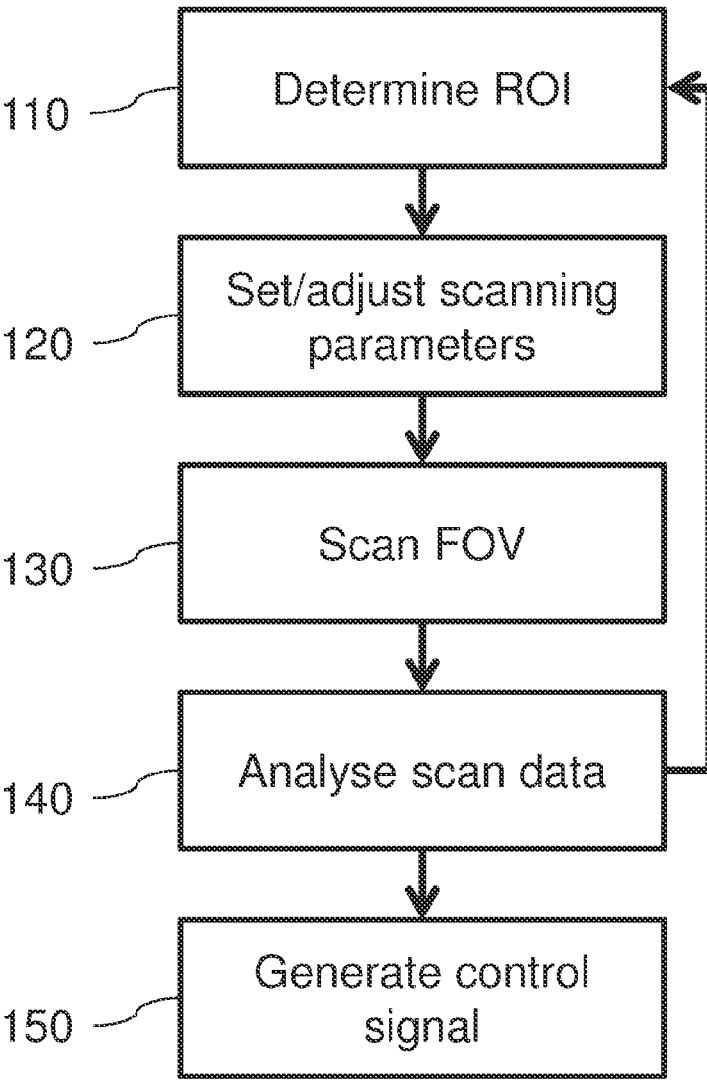
FIG. 2 shows a flow chart of a method for implementing the invention.

FIG. 2 shows a flow chart of a method according to an embodiment of the invention for controlling a vehicle system, in this example a suspension system. It should be appreciated that the method is described as applied to control of a suspension system for illustrative purposes only, and many other vehicle systems may be operated according to similar methods.

The method is executed by the controller 10, which may be situated anywhere in the vehicle 100. Alternatively, the method may be (partly or fully) executed by a computer elsewhere outside the vehicle 100, in which case the controller 10 functions to relay sensor data and control instructions between the vehicle 100 and the remote computer.

In a first, region determining step 110, the controller 10 determines a region of interest within the field-of-view of a scanning system 11-15 of the vehicle 100. The region of interest is determined on the basis of algorithms that indicate which portions of the field-of-view are, for example, most important for making optimal vehicle control decisions.

As noted above, in this example the scanning system 11-15 is used for controlling vehicle suspension, and so the region of interest is determined accordingly. In particular, for this application a region of interest is typically defined to correspond to a surface over which a road wheel of the vehicle 100 is about to travel, namely a small area of the road surface, slightly wider than a tyre width of the respective wheel and a few meters ahead of the current position of the wheel. It is noted that this process is iterated for at least each of the two front road wheels of the vehicle (or the rear road wheels if the vehicle 100 is reversing), so that a respective region of interest is determined for each road wheel.

The location, width and length of such a region of interest may depend on a current vehicle speed, driving direction and terrain type. Navigation system data, accelerometers and brake or accelerator pedal sensors may be used for predicting the vehicle's speed, direction and underlying road surface in the near future, which may also be used to redefine the region of interest.

Also, weather and other external conditions may be taken into account in determining the region of interest. If, for example, it is known that rain or direct sunlight reduce detection accuracy with respect to the features that need to be detected by the scanning system, the region of interest may be narrowed to provide more accurate data concerning the most important part of the field-of-view. In more favourable conditions when sufficient accuracy is less of a concern or more readily achievable, the region of interest may be enlarged to increase the chances of detecting all relevant features.

Feedback from the suspension control system may also be used for redefining the region of interest.

It is also noted that regions of interest may be predefined and may, for example, be retrieved by the controller 10 from a look-up table or similar. This is particularly the case in the context of operating a suspension system in which case, as already noted, regions of interest will correspond to areas directly ahead of road wheels of the vehicle 100 with respect to a direction of travel.

In a blend of these approaches, a predefined region of interest may represent a starting point for the controller 10, which may then refine the region of interest based on real-time data.

The region of interest may further depend on portions of the field-of-view that require closer attention to determine the presence and nature of objects located within those portions with accuracy. For example, if a possible object of interest is detected during a general scan at relatively low resolution, the region of interest is then adapted to focus on a portion of the field-of-view containing the object to confirm its nature through a higher resolution scan. For this, different scanning systems 11-15 may also cooperate. For example, analysis of video data captured by a camera system may provide an initial indication of the presence of features of interest (objects, vehicles, pedestrians, potholes or bumps, terrain types, etc.) within the field-of-view, thereby highlighting portions of the field-of-view that the controller 10 can allocate further resources to by designating them as regions of interest for the scanning system 11-15.

The determined region of interest will generally be one continuous area defining a relatively small portion of the full field-of-view. However, in particular situations, it may be useful to identify two or more separate regions of interest inside the field-of-view or to extend the region of interest to encompass the entire field-of-view.

In a second, scanner adjustment step 120, the controller 10 sets or adjusts the relevant scanning parameters in dependence on the, or each, region of interest determining in the preceding step of the method. These scanning parameters are set such that a scanning resolution for the region of interest is higher than the scanning resolution for the remaining parts of the field-of-view. For example, the majority of the field-of-view may be scanned at a nominal scanning resolution, while the region(s) of interest is scanned at an elevated scanning resolution relative to the nominal scanning resolution. Alternatively, the scanning parameters can be adjusted such that only the region(s) of interest is/are scanned.

It is noted that 'scanning resolution' is herein used as a broad term for any settings that may affect the quality of the scan in the region of interest when compared to other parts in the field-of-view. Different scanning parameters can be used for different regions in the field-of-view. Scanning resolution and scanning quality can, for example, be increased in the region of interest by:

- reducing a scanning speed and/or the angular intervals at which data points are gathered, each of which reduces the distance between two measurement points and therewith increase the number of measurements per unit area;
- increasing a scanning power to obtain a more accurate and/or reliable measurement; and/or
- increasing a scanning frequency at which the scanning system scans the region of interest—for example, the region of interest may be scanned twice for each time the remainder of the full field-of-view is scanned.

For example, a lidar scanner measures distance to a target by illuminating the target with laser light and measuring the reflected light with a sensor. When using sequential scanning via, for example, galvo mirrors, rotating prisms or MEMS mirrors, differences in laser return times and wavelengths can be used to make digital 3-D representations of the target. In this context, increasing the scanning resolution when using a lidar scanner may entail: increasing the intensity of the laser light when scanning the region of interest; reducing the speed at which the mirrors or prisms turn when scanning the region of interest; and/or controlling the mirrors or prisms to scan the region of interest more frequently than other parts of the field of view.

In addition to one or more regions of interest and a remaining field-of-view, intermediate areas may also be defined in which the scanning system operates with settings resulting in an intermediate scanning resolution. Also, one or more areas of low interest may not be scanned at all in order to preserve resources and scanning capacity for scanning the most important regions of the field-of-view.

Instead of discrete, step changes in scanning resolution as set out above, it is also possible for the scanning resolution to be varied continuously during scanning, such that the resolution transitions gradually between relatively high levels during scanning of each region of interest, and lower levels whilst scanning other areas of the field-of-view. A mixture of continuous and step-changes in scanning resolution may also be employed.

Newer scan technologies such as optical phased arrays and some specific MEMS architectures not only allow for sequential scanning, but also provide more 'random access' type of scanning. This creates an opportunity to target specific areas of the field-of-view as may be required, and thereby scan different regions at different scanning resolutions more readily when using such systems.

Similar measures for adapting the scanning resolution will be available when using ultrasound scanning instead of, or in addition to, lidar scanning. Digital camera systems as already described above may also be controlled in dependence on the determined region of interest.

For example, a movable camera with a 110° wide angle lens may be rotatably mounted to have a total field-of-view of 180° or more. Depending on the position of the region of interest within the field-of-view, the camera may be rotated and/or have its focal length (or 'zoom factor') adjusted to focus on the region of interest, or it may be configured to scan the full 180° field-of-view, but with additional emphasis (slower scanning, higher frame rate, increased power, increased focal length, etc.) on the region of interest. A possible scanning pattern would be to scan the region of interest with every sweep of the camera, while scanning the remaining regions only once every two or three sweeps.

Alternatively, even if the camera itself does not move, another way to vary the effective scanning resolution, and thereby save processing power and processing time, is to analyse data captured by the camera that relates to the region of interest more thoroughly than data relating to the remainder of the field-of-view. This may entail analysing all data collected that relates to the region of interest, while analysing only every second or third frame of data relating to the remainder of the field-of-view, and/or analysing only a subset of the pixels of images captured of the remainder of the field-of-view.

In a third, scanning step 130, the scanning system is operated to scan the field-of-view using the scanning parameters that have just been set or adjusted, so that different regions of the field-of-view are scanned at different scanning resolutions.

In a fourth, analysis step 140, the controller 10 receives the scanning data from the scanning sensors 11-15 and analyses the data related to the region of interest to identify a feature within that region. Incoming data relating to the remainder of the field-of-view may be processed simultaneously, using the same algorithms, or separately, possibly using separate algorithms that may even serve different purposes. For example, returning to the example of a suspension system 21, 22 being controlled on the basis of scanning data related to the region of interest, the scanning data may be used to determine the presence and nature of objects or features that a road wheel of the vehicle 100 will encounter, such as a change in road surface texture, potholes, stones, etc. Meanwhile, the remaining data, obtained by scanning at a lower resolution, is used for line detection, guardrail detection and/or the detection of other vehicles or objects on the road.

In a fifth, vehicle control step 150, the results of the analysis step 140 are used to generate a control signal to adjust operation of the vehicle 100 in accordance with the, or each, feature identified within the region of interest. These control signals may then be sent to the respective vehicle control systems 20, 21 to adapt their functioning based on the identified features. This may, for example, lead to the adjustment of a suspension system 21, 22, for example to increase damping as a road wheel negotiates a pothole.

Other ways to control operation of the vehicle 100 may include controlling vehicle acceleration, braking or a steering direction, optionally in the context of implementing driver assistance or collision mitigation. Further options may include operating auxiliary vehicle systems such as energy recovery systems based on scan data.

Altering operation of the vehicle 100 may also entail operating a human-machine interface (HMI) of the vehicle 100 based on the results of the analysis performed by the controller 10, for example to indicate detected objects to a driver of the vehicle 100.

The results of the analysis step 140 may further be fed back to the region determining step 110, in order to adapt the region of interest on the basis of identified features as may be appropriate.

With the control system according to the invention, it becomes possible to control the vehicle based on more accurate sensor information and to improve the vehicle performance and/or the comfort of the driver and other passengers, without reducing the actual field-of-view or replacing the sensors. By focusing the capacity of the scanning system on regions of interest, and paying less attention to the remaining field-of-view, more time and power can be devoted to scanning certain portions of the field-of-view. This allows for quicker reactions from the vehicle control system and an increased chance of timely and accurate detection of any object or road feature that may warrant a control action from the vehicle control system. By continuing to monitor the remainder of the field-of-view, the system can remain responsive to objects and events occurring outside the region of interest, and adapt the region of interest if necessary. When needed, the control system may change the region of interest or, temporarily, use a single scanning resolution for the full field-of-view.

Figure 3:
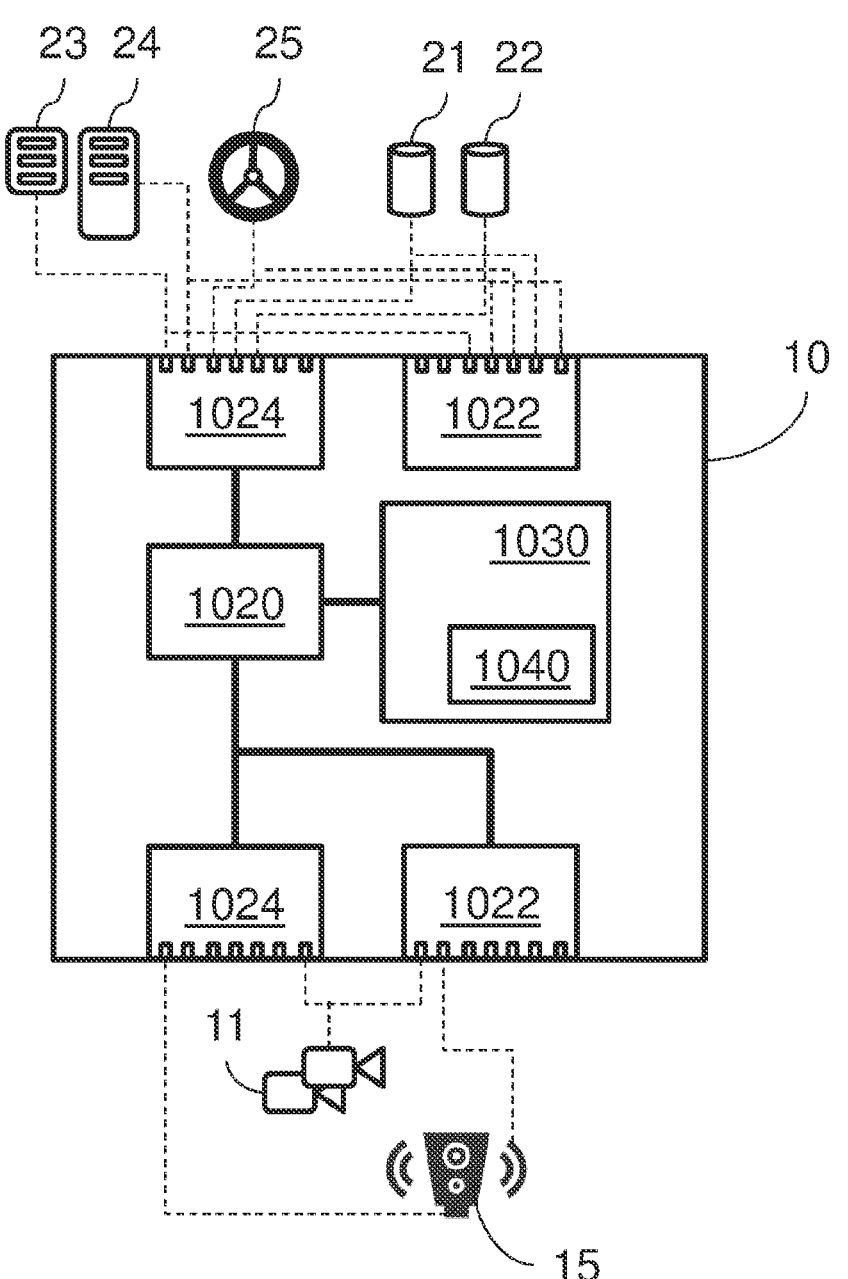
FIG. 3 shows a block diagram of a vehicle control system according to the invention.

With reference to FIG. 3, there is illustrated a simplified example of a control system 200 such as may be adapted to implement the method of FIG. 2 described above. The control system 200 comprises one or more controllers 10 and is configured to determine a region of interest within a field-of-view of a scanning system of the vehicle, and operate the scanning system to scan portions of the field-of-view outside the region of interest at or below a nominal scanning resolution, and to scan the region of interest at an increased scanning resolution relative to the nominal scanning resolution. The control system 200 is further configured to receive a signal comprising data obtained by the scanning system related to the region of interest, analyse the data related to the region of interest to identify a feature within the region of interest, and generate a control signal to adjust operation of the vehicle in accordance with the feature identified within the region of interest.

It is to be understood that the or each controller 10 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 10 may be embodied in, or hosted in, different control units or computational devices.

As used herein, the terms 'controller', 'control unit', or 'computational device' will be understood to include a single controller, control unit, or computational device, and a plurality of controllers, control units, or computational devices collectively operating to provide the required control functionality.

A set of instructions could be provided which, when executed, cause the controller 10 to implement the control techniques described herein (including some or all of the functionality required for the method described herein). The set of instructions could be embedded in said one or more electronic processors of the controller 10. Alternatively, the set of instructions could be provided as software to be executed in the controller 10.

A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 3, the or each controller 10 comprises at least one electronic processor 1020 having one or more electrical input(s) 1022 for receiving one or more input signal(s), and one or more electrical output(s) 1024 for outputting one or more output signal(s). As already described above, input signals may, for example, come from scanning systems such as a lidar system 15 or a camera or stereo camera system 11. Accordingly, the input signals comprise data obtained by the scanning system, at least some of which relates to a region of interest determined by the controller 10 as set out above.

Output signals may be sent to, for example, an acceleration unit 23, a braking unit 24, a steering unit 25, or a suspension unit 21, 22. Such output signals may comprise control signals configured to adjust operation of the vehicle, for example by altering a driving parameter, or by operating an HMI to provide information to a driver.

It is noted that all or most units being controlled by the controller 10 may additionally comprise sensors for monitoring their status. Such sensors may be electrically coupled to one or more input(s) 1022 of the controller 10, and further control procedures may be partly based on the input of such sensors.

Similarly, the scanning system 15 and the camera or stereo camera system 11 do not only provide input signals, but are coupled to one or more output(s) 1024 of the controller too to allow them to receive control instructions from the electronic processor 1020. As described above, such control instructions may, for example, cause an orientation, focal length or scanning resolution to be altered.

While FIG. 3 shows a controller with separate electrical inputs and outputs 1022, 1024, input and output connections may be combined in I/O units. It is further noted that all communication may be wired or wireless.

The or each controller 10 further comprises at least one memory device 1030 electrically coupled to the at least one electronic processor 1020 and having instructions 1040 stored therein. The at least one electronic processor 1020 is configured to access the at least one memory device 1030 and execute the instructions 1040 thereon so as to analyse data related to the region of interest to identify features within the region of interest, and to generate the or each control signal.

The, or each, electronic processor 1020 may comprise any suitable electronic processor (e.g., a microprocessor, a microcontroller, an ASIC, etc.) that is configured to execute electronic instructions. The, or each, electronic memory device 1030 may comprise any suitable memory device and may store a variety of data, information, threshold value(s), look-up tables or other data structures, and/or instructions therein or thereon. In an embodiment, the memory device 1030 has information and instructions for software, firmware, programs, algorithms, scripts, applications, etc. stored therein or thereon that may govern all or part of the methodology described herein. The, or each, electronic processor 1020 may access the memory device 1030 and execute and/or use those instructions and information to carry out or perform some or all of the functionality and methodology described herein.

The at least one memory device 1030 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 1010 have been described comprising at least one electronic processor 1020 configured to execute electronic instructions stored within at least one memory device 1030, which when executed causes the electronic processor(s) 1020 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

Figure 4:
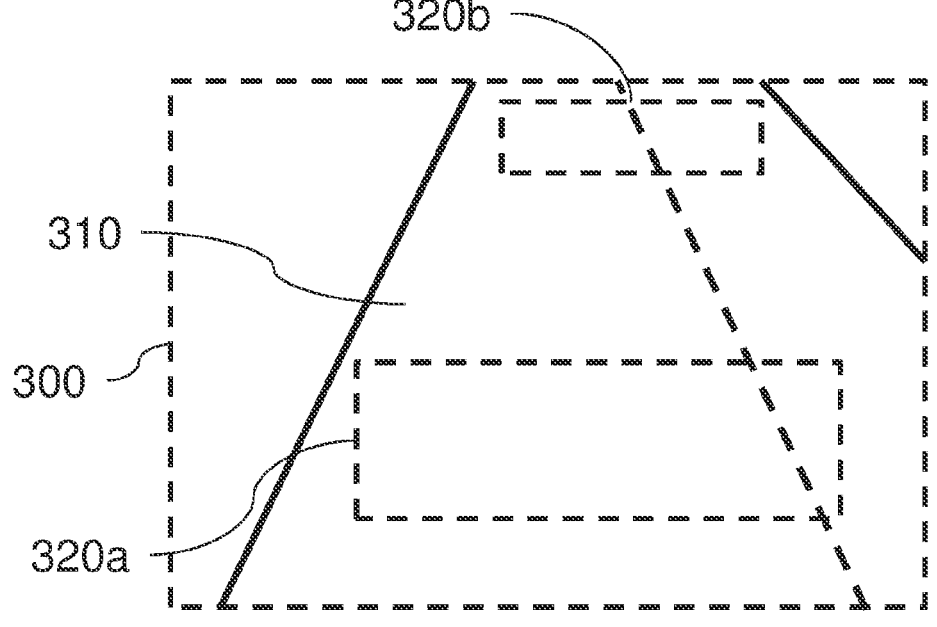
FIG. 4 represents a field-of-view of a scanning system of the vehicle of FIG. 1.

For completeness, FIG. 4 illustrates in a simplified, schematic manner a field-of-view 300 of the scanning system 15 of the vehicle 100. In the case where the scanning system 15 is a forward-facing lidar system, the field-of-view 300 represents the total area over which the laser of the lidar system can be directed to collect data regarding the scene ahead of the vehicle 100. It is noted that in practice the field-of-view 300 would be much wider than is suggested by FIG. 4, which is purely illustrative.

As shown, the field of view 300 is generally oblong, extending further horizontally than vertically. This reflects the manner in which vehicle scanning systems such as lidar systems are configured, in that the horizontal sweep is typically significantly greater than the vertical range, owing to the greater importance of scanning side-to-side across the forward environment to detect hazards or road features, as the scanning system 15 typically does not need to detect objects at a level above the height of the vehicle 100.

FIG. 4 shows that the field-of-view 300 contains a stretch of road 310 along which the vehicle 100 is travelling, the vehicle 100 being in a left lane of the road 310 as viewed in FIG. 4.

Two regions of interest are defined within the field-of-view 300: a first region of interest 320a, which is a short distance ahead of the vehicle 100 and thus in a lower portion of the field-of-view 300; and a second region of interest 320b, which is directed towards a part of the field-of-view 300 corresponding to a location much further down the road 310.

For example, the first region of interest 320a may be approximately five meters from the vehicle 100 and focused on an area immediately ahead of the vehicle 100, i.e. in the lane in which the vehicle 100 is travelling. This region of interest 320a may be used for detecting objects and road features that the vehicle 100 is about to encounter, which may be used to adjust suspension settings as described above.

The second region of interest 320b may be 100 meters or more from the vehicle 100, and is used to detect oncoming vehicles and other potential hazards. Accordingly, the second region of interest 320b is determined to straddle both lanes of the road 310.

It should be appreciated that the first region of interest 320a and/or the second region of interest 320b could move to the left or to the right in response to a detected steering angle or information from a navigation system. Similarly, these regions of interest 320a, 320b could move up or down within the field-of-view in dependence on an indicated vehicle speed.

It is noted that the second region of interest 320b is smaller than the first region of interest 320a, which reflects the capabilities of the scanning system 15 in terms of range and resolution. For example, a lidar system may typically be able to scan at high resolution over and angle of 120° at a range of 50 meters, whereas at a range of 200 m the angle over which high resolution data may be collected reduces to 30°.

It will be appreciated that various changes and modifications can be made to the present invention without departing from the scope of the present application.

The invention claimed is:

1. A control system for a vehicle, the control system comprising one or more controllers, the control system being configured to:

determine a first region of interest and a second region of interest within a field-of-view of a scanning system of the vehicle, wherein the first region of interest is in front of a first road wheel of the vehicle and the second region of interest is in front of a second road wheel of the vehicle, and wherein a location, a width, and a length of each of the first region of interest and the second region of interest are based on a current vehicle speed, driving direction, and terrain type;

operate the scanning system to scan portions of the field-of-view outside the first region of interest and the second region of interest at or below a nominal scanning resolution, and to scan the first region of interest and the second region of interest at an increased scanning resolution relative to the nominal scanning resolution;

receive a first signal comprising first data obtained by the scanning system related to the first region of interest and the second region of interest;

analyze, via a first algorithm, the first data related to the first region of interest and the second region of interest to identify a feature within the first region of interest or the second region of interest, wherein the first data is analyzed to detect objects or features that each road wheel is expected to encounter;

receive a second signal comprising second data obtained by the scanning system related to the portions of the field-of-view outside the first region of interest and the second region of interest;

analyze, via a second algorithm, the second data related to the portions of the field-of-view outside the first region of interest and the second region of interest, wherein the second data is analyzed for line detection, guardrail detection, and/or detection of other vehicles; and generate a control signal to adjust operation of the vehicle in accordance with the feature identified within the first region of interest or the second region of interest, wherein the control signal is configured to adjust operation of a suspension system of the vehicle.

2. The control system of claim 1, wherein operating the scanning system to scan at an increased scanning resolution comprises any one or more of: reducing a scanning speed of the scanning system; increasing a scanning power of the scanning system; increasing a focal length of the scanning system; and increasing a scan frequency at which the scanning system scans the region of interest.

3. The control system of claim 1, wherein the objects or features that each road wheel is expected to encounter comprise a change in road surface texture, a pothole, and a stone.

4. The control system of claim 1, further configured to determine the first region of interest to correspond to a location directly ahead of the first road wheel of the vehicle with respect to the driving direction, such that the first region of interest includes a surface over which the first road wheel is about to travel.

5. The control system of claim 1, wherein analyzing the first data and analyzing the second data comprises analyzing the first data more thoroughly than the second data, including analyzing all of the first data collected, while analyzing only every second or third frame of the second data collected, and/or analyzing only a subset of the pixels of images captured of the portions of the field-of-view outside the first region of interest and the second region of interest.

6. The control system of claim 1, wherein operating the scanning system to scan at an increased scanning resolution comprises any one or more of:

reducing a scanning speed of the scanning system;

increasing a focal length of the scanning system; and increasing a scan frequency at which the scanning system scans the first region of interest and the second region of interest relative to the portions of the field-of-view outside the first region of interest and the second region of interest.

7. The control system of claim 1, wherein operating the scanning system to scan at an increased scanning resolution comprises reducing a speed at which mirrors or prisms of the scanning system turn when scanning the first region of interest and the second region of interest and/or controlling the mirrors or prisms to scan the first region of interest and the second region of interest more frequently than the portions of the field-of-view outside the first region of interest and the second region of interest.

8. The control system of claim 1, configured to:

characterize the feature identified within the first region of interest or the second region of interest as any of: an irregularity in a surface over which the vehicle is travelling; an obstacle; and a pothole; and generate the control signal to adjust operation of the vehicle in accordance with the characterization of the feature identified within the first region of interest or the second region of interest.

9. The control system of claim 1, wherein operating the scanning system to scan portions of the field-of-view outside the first region of interest and the second region of interest at or below the nominal scanning resolution, and to scan the first region of interest and the second region of interest at the increased scanning resolution relative to the nominal scanning resolution comprises adjusting the scanning resolution between the nominal scanning resolution and the increased scanning resolution in a gradual manner.

10. A system, comprising:

a vehicle scanning system; and the control system of claim 1, including at least a first controller, wherein the at least a first controller is arranged to output a signal for operating the scanning system to scan portions of the field-of-view outside the first region of interest and the second region of interest at or below a nominal scanning resolution, and to scan the first region of interest and the second region of interest at an increased scanning resolution relative to the nominal scanning resolution.

11. A vehicle comprising the control system of claim 1.

12. A method for operating a vehicle scanning system of a vehicle, the method comprising:

determining regions of interest within a field-of-view of the vehicle scanning system, the regions of interest including a respective region of interest ahead of each road wheel of the vehicle, wherein a location, a width, and a length of each region of interest are based on a current vehicle speed, driving direction, and terrain type;

operating the vehicle scanning system to scan portions of the field-of-view outside the regions of interest at or below a nominal scanning resolution, and to scan the regions of interest at an increased scanning resolution relative to the nominal scanning resolution;

receiving a signal comprising first data obtained by the scanning system related to the regions of interest;

analyzing, via a first algorithm, the first data to identify a feature within one or both of the regions of interest, the feature including an irregularity in a surface over which the vehicle is travelling, an obstacle, or a pothole;

receiving a second signal comprising second data obtained by the scanning system related to the portions of the field-of-view outside the regions of interest;

analyzing, via a second algorithm, the second data, wherein the second data is analyzed for line detection, guardrail detection, and/or detection of other vehicles; and generating a control signal to adjust operation of the vehicle in accordance with the feature identified within one or both of the regions of interest, wherein the control signal is configured to adjust operation of a suspension system of the vehicle.

13. A non-transitory, computer-readable storage medium storing instructions thereon that, when executed by one or more electronic processors, causes the one or more electronic processors to carry out the method of claim 12.

\* \* \* \* \*